United States Patent [19]

Edelman et al.

[11] E Re. 28,676

[45] Reissued Jan. 13, 1976

[54] CONTROL APPARATUS

[75] Inventors: Walter E. Edelman, San Marcos, Calif.; David J. Sutton, Minneapolis, Minn.

[73] Assignee: Honeywell Inc., Minneapolis, Minn.

[22] Filed: Jan. 31, 1974

[21] Appl. No.: 438,487

Related U.S. Patent Documents

Reissue of:

[64] Patent No.: 3,284,002
Issued: Nov. 8, 1966
Appl. No.: 406,397
Filed: Oct. 26, 1964

[52] U.S. Cl. ..... 236/1 C; 165/26; 236/68 B
[51] Int. Cl.[2] ..... G05D 23/30
[58] Field of Search ..... 165/26; 236/68 B, 68 R, 236/1 C; 337/377, 398, 112

[56] References Cited

UNITED STATES PATENTS

| | | | |
|---|---|---|---|
| 2,564,120 | 8/1951 | McLean | 236/68 X |
| 2,729,719 | 1/1956 | Kronmiller | 337/377 X |
| 2,855,484 | 10/1958 | Kreuter | 337/344 |
| 2,969,916 | 1/1961 | Shequen | 165/26 X |
| 3,157,801 | 11/1964 | Shequen | 236/68 X |

*Primary Examiner*—William E. Wayner
*Attorney, Agent, or Firm*—Clyde C. Blinn; Henry L. Hanson

[57] ABSTRACT

*A thermostat for controlling heating apparatus is converted to a thermostat for controlling heating and cooling apparatus by the addition of a subbase. The heating thermostat has a double switch attached to a bimetal and a heating anticipation heater whereby heating apparatus is controlled when connected to the terminals of the thermostat. When it is desired to use the thermostat to control both heating and cooling apparatus, the thermostat is removed from the wall and a subbase is placed under the thermostat. The subbase has a cooling anticipation heater which is thermally connected to the bimetal. The subbase has terminals to connect the assembly of thermostat and subbase to the heating and cooling apparatus.*

6 Claims, 5 Drawing Figures

INVENTORS
WALTER E. EDELMAN
DAVID J. SUTTON
BY Clyde C. Blinn
ATTORNEY

CONTROL APPARATUS

Matter enclosed in heavy brackets [ ] appears in the original patent but forms no part of this reissue specification; matter printed in italics indicates the additions made by reissue.

The present invention is concerned with an improvement in a thermostat for a heating and cooling system; in particular, a thermostat is provided with a double switch so one portion of the switch can be normally used to control heating apparatus and upon the addition of a subbase which has a heater to artificially heat the temperature responsive device in the thermostat, the thermostat can control both heating and cooling apparatus.

Heretofore, when temperature controls were provided for controlling heating apparatus, a space temperature control or thermostat was not easily converted to control cooling apparatus should the temperature conditioning apparatus of the building or dwelling be modified to add cooling apparatus. Upon such a modification of the conditioning apparatus for cooling, a new thermostat which had provisions for controlling both heating and cooling apparatus was substituted for the old thermostat at a considerable expense to the home owner.

Various ways are used to reduce the cost of the conversion from heating to a heating and cooling system. One particular scheme is to add an additional relay to the normal heating thermostat for reversing the switch operation of the heating thermostat so the heating thermostat can be used to control either heating or cooling apparatus. Obviously such a reversing relay becomes expensive and increases the overall cost of the modification of the existing heating system to a heating and cooling system. In addition, the heat effects of a relay may cause poor operation of the thermostat.

The present invention provides for the addition of a subbase to a heating thermostat which has a switch means adaptable to control a cooling apparatus. The subbase contains a heat anticipation heater means which is thermally connected to the temperature responsive means of the thermostat when the subbase is mounted on the thermostat. With such a subbase, the thermostat is adapted for controlling both heating and cooling apparatus, and the initial expense and expense of conversion of the heating system to a heating and cooling system is maintained at a minimum. The present invention provides for a reduction in the initial expense to the home owner by eliminating the anticipation heater used during the cooling operation in the thermostat. The anticipation heater for cooling is placed in the subbase to be thermally coupled to the thermostat when the subbase is mounted on the thermostat.

An object of the present invention is to provide an improved thermostat and subbase combination wherein the anticipation heater used during the cooling operation is mounted on the subbase and is thermally coupled to the temperature responsive means in the thermostat.

Another object of the present invention is to provide a thermostat with a temperature responsive means supported on a member attached to a base so the thermostat can normally control heating apparatus. Upon the attachment of a subbase, an artificial heating means is added which is supported by a resilient means biased against the member to conduct heat from the subbase to the temperature responsive means for anticipation purposes when cooling apparatus is controlled.

Another object of the present invention is to provide a subbase adapted to be connected to a thermostat with a heater in the subbase thermally coupled to the thermostat for anticipation when the thermostat controls cooling apparatus.

These and other objects of the present invention will be understood upon a study of the following specification and claims of which:

Figure 1:
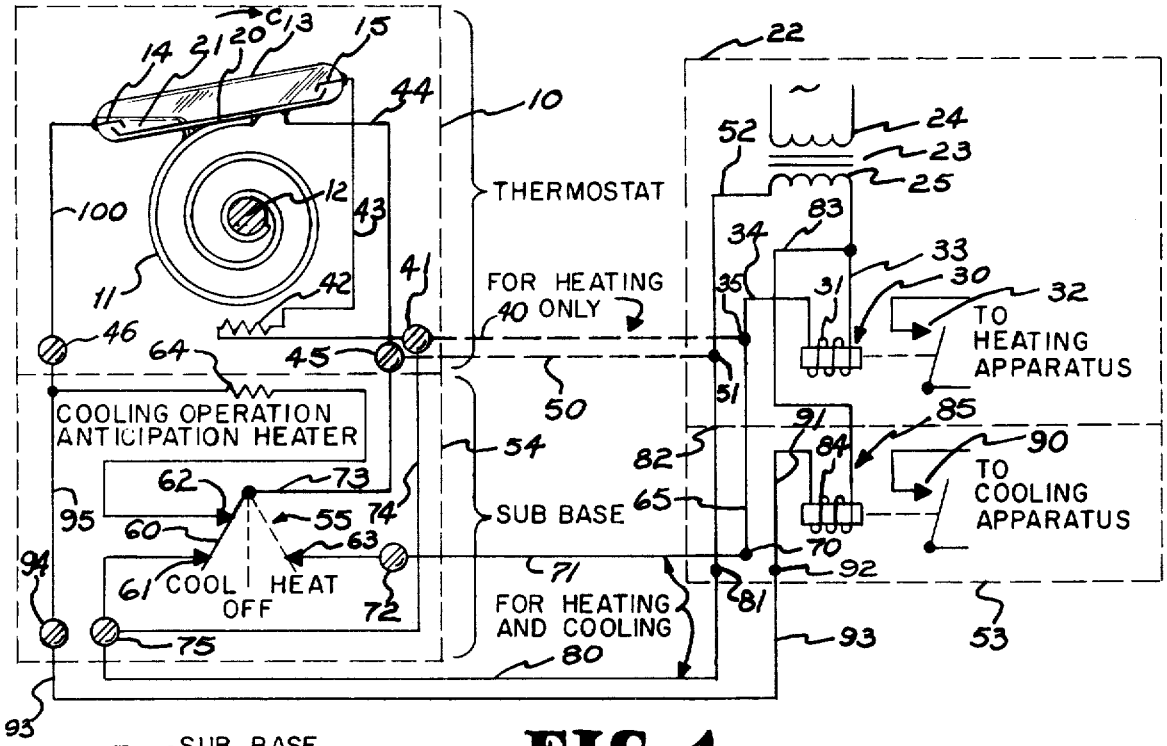
FIG. 1 is a schematic representation of a thermostat and subbase combination used to control heating and cooling apparatus.

Referring to FIG. 1, a thermostat 10 is used to control the temperature in a space. Thermostat 10 has a temperature responsive means or bimetal 11 which is mounted on a support or post 12. Connected to the free end of bimetal 11 is a switch 13. The switch 13 is of an SPDT mercury switch type having two end electrodes 14 and 15 and a center common electrode 20 to form a circuit closing switch at each end when the mercury 21 covers either electrodes 14 and 20 or electrodes 15 and 20. Thermostat 10 is normally connected to control 22 for controlling heating apparatus. Apparatus 22 contains a source of power 23 having a primary winding 24 and a secondary winding 25. A heating relay 30 has a winding 31 and a normally open switch 32 which is adapted to be connected to temperature conditioning or heating apparatus.

Relay 30 is energized when switch 13 tips to the right to close the circuit between electrodes 15 and 20 through a circuit traced as follows: from secondary 25, a conductor 33, winding 31, a conductor 34, a terminal 35, a conductor 40, a terminal 41 on thermostat 10, a resistor 42 which is thermally connected to bimetal 11 for heat anticipation purposes, a conductor 43, electrode 15, electrode 13, a conductor 44, a terminal 45, a conductor 50, a terminal 51, conductor 52, and back to the other side of the secondary 25. Upon a drop in temperature of the space containing thermostat 10, bimetal 11 moves switch 13 to the right to close the circuit between electrodes 15 and 20 to energize relay 30 and the heating apparatus. The current circulating through the circuit passes through heater 42 to artificially heat the bimetal 11 to cause the bimetal temperature to rise to anticipate increase in space temperature due to the operation of the heating apparatus. The heating apparatus is then deenergized earlier than without anticipation.

In order to convert the system to a heating and cooling system by the addition of the cooling control 53, a subbase 54 is added to thermostat 10. The subbase may be physically connected as well as electrically connected by terminal screws 41, 45 and 46. Subbase 54 contains a change-over or cool-off-heat switch 55 which has a movable member 60 engaging contacts 61 and 62 when in the cool position and contact 63 when in the heat position for selectively switching the system to obtain cooling or heating or to turn the system off. Heater 64 mounted in subbase 54 is positioned to be thermally connected or coupled to bimetal 11 when the subbase 54 is mounted on the thermostat. Heater 64 is used for anticipation purposes when the thermostat is ued to control the cooling apparatus. When thermostat 10 is used for controlling the heat apparatus 22 and the cooling apparatus 53, the connections for the thermostat are made through the subbase 54. The circuit for the control of the heat apparatus 22 is modified to be traced as follows: from the secondary winding 25 of the transformer, conductor 33, winding 31, conductor 34, a conductor 65, a terminal 70, a conductor 71, a terminal 72 on subbase 54, contact 63, movable member 60 when in the heat position, a conductor 73, terminal 45, conductor 44, electrode 20, electrode 15, conductor 43, heater 42, terminal 41, a conductor 74, a terminal 75 on subbase 54, a conductor 80, a terminal 81, a conductor 82, conductor 52, and back to the other side of a source of power. Upon the decrease in temperature of bimetal 11, switch 13 controls relay 30 to operate the heating apparatus in the same manner as was the case when the thermostat 10 was connected to control apparatus 22 by the circuit through conductors 40 and 50 which are not used for the heating and cooling connections.

The operation of the cooling apparatus is accomplished by thermostat 10 when the switch 55 of the subbase is moved to the cool position as shown with member 60 engaging contacts 61 and 62 through a circuit traced as follows: from the secondary 25, a conductor 83, an energization winding 84 of a relay 85 which has a normally open switch 90 attached to be connected to cooling apparatus, a conductor 91, a terminal 92, a conductor 93, a terminal 94 on subbase 54, conductor 95, terminal 46, conductor 100, electrode 14, electrode 20, conductor 44, terminal 45, conductor 73, member 60, contact 61, terminal 75, conductor 80, terminal 81, conductor 82, conductor 52, and back to the other side of the source of power. The anticipation heater 64 is connected in parallel with the switch formed by electrodes 14 and 20 by a circuit traced as follows: from conductor 44, terminal 45, conductor 73, member 60, contact 62, heater 64, terminal 46 and to conductor 100. When the switch of electrodes 14 and 20 is open, heater 64 is connected across secondary 25 through the circuit including winding 84 so bimetal 11 is artificially heated during the off cycle of the cooling operation of thermostat 10 to anticipate the effect of the operation of the cooling apparatus.

Figure 2:
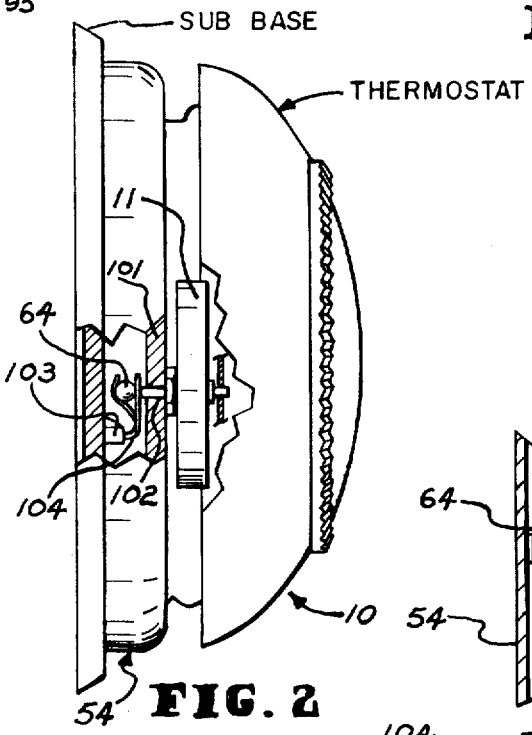
FIG. 2 is a side cut away view of a typical thermostat having an anticipation heater mounted in the subbase to be thermally coupled to the temperature responsive means in the thermostat.
Figure 5:
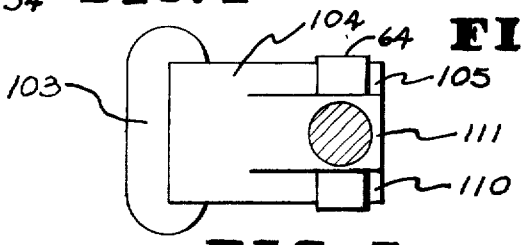

Referring to FIG. 2, a specific thermostat and subbase is shown. Bimetal 11 is mounted on a base or support means 101 by a post or support means 102. Heater 64 is mounted on subbase 54 by means of a platform 103 integrally molded into the subbase for supporting a resilient connection or spring 104. Spring 104 as shown in FIG. 5 has a cut section to provide two lower fingers 105 and 110 and an upper flanger 111 so resistor or heater 64 can be mounted between the fingers and finger 111 can be resiliently biased against support 102 to thermally conduct the heat from heater 64 to bimetal 11.

Figure 3:
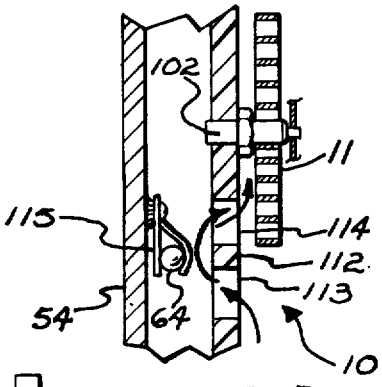
FIG. 3 is another embodiment of the present invention disclosing the coupling of the heater in the subbase to the temperature responsive means of the thermostat by air flow through a hole in the base of the thermostat.

Referring to FIG. 3, another embodiment discloses the thermostat and subbase. Bimetal 11 is mounted on the base of the thermostat by a support 102. The base of the thermostat 112 has at least two holes 113 and 114. Heater 64 is mounted on the subbase by means of a spring clip 115 similar to that disclosed in FIG. 5 except that the clip does not engage support 102. Heater 64 is held in a position so the heat from the heater warms the air which passes through holes 113 and 114 to change the temperature surrounding bimetal 11. In such a manner, heater 64 is thermally connected to the temperature responsive means of the thermostat when subbase 54 is mounted on thermostat 10.

Figure 4:
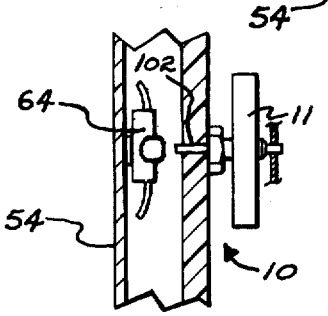
FIG. 4 is another embodiment of the present invention showing the heater in the subbase adjacent the support of the temperature responsive element in the thermostat to thermally couple the heater and temperature responsive means and FIG. 5 is a detailed showing of the resilient support for the heater mounted in the subbase as shown in FIG. 2.

Referring to FIG. 4, another embodiment of the invention discloses the thermostat 10 and subbase 54 with heater 64 mounted on subbase 54 away from the support 102 of bimetal 11 so that heat from heater 64 radiates to support 102 to be conducted through the support to the bimetal whereby the heater 64 can be thermally coupled to the bimetal 11 when the subbase 54 is mounted on thermostat 10.

Operation

Initially when a home owner would have a thermostat for controlling heating apparatus, thermostat 10 would be connected to control apparatus 22 by conductors 40 and 50. The operation of the thermostat with the bimetal cooled down would be in a conventional manner to cause the switch formed by shorting electrodes 15 and 20 to energize relay 30 to bring about the operation of the heating apparatus. By providing thermostat 10 with the SPDT switch 13, even though the second circuit formed by electrodes 14 and 20 is not used when the thermostat is connected for heating only, the added cost to the home owner is relatively small as other parts of the thermostat which are necessary for use in heating and cooling systems are not contained in thermostat 10.

Later upon the addition of cooling apparatus to the house, the cooling control panel 53 is added and subbase 54 is added to thermostat 10. The subbase 54 connects the thermostat 10 to the heating and cooling controls 22 and 53, respectively, by conductors 71, 80 and 93. Subbase 53 contains the changeover switch 55 which provides for the selection of control by thermostat 10 of heating or cooling depending on the position of the movable member 60. Subbase 54 also contains the cooling anticipation heater 64 which is mounted in the subbase so as to be thermally connected to the bimetal. Upon the operation of thermostat 10 as a cooling thermostat, the heat from heater 64 artificially heats the bimetal during the off cycle for anticipation purposes only.

The specific structure of the subbase is shown in FIG. 2. Heater 64 is held on the subbase by the resilient spring 104 and a finger 111 as shown in FIG. 5 is biased to the right as shown in FIG. 2 to engage the support 102. Heater 64 is thermally connected to bimetal 11 by the heat conduction through the spring 111 and the support 102.

In FIGS. 3 and 4 two other alternate designs are shown for providing the heater 64 in the subbase and conducting the heat to the bimetal in the thermostat.

The thermostat of FIG. 3 has two holes 113 and 114 to provide air flow so air can flow to the rear of the thermostat and back up heat from heater 64 which is mounted in the subbase to deliver the heat to the bimetal for anticipation purposes. The embodiment of FIG. 4 has the heater 64 mounted in the subbase so heat can be transferred to the support 102 to conduct the heat to bimetal 11.

The present invention provides an improvement over thermostat and subbase combinations which heretofore have been used to provide a heating thermostat which can be readily adapted for heating and cooling installation by the addition of a subbase to make use of the heating thermostat for the heating and cooling system. When reversing relays and switches are used in the subbase to obtain a reversal of a normal heating thermostat, the added heat of the relays as well as the cost of the relays make such a thermostat and subbase combination objectionable. The present invention provides for an inexpensive design whereby with a slight additional cost to the thermostat by using a three electrode switch, the thermostat can be used with an inexpensive subbase to make a heating and cooling control system which provides good control results. The anticipation heater is mounted in the subbase to eliminate the cost of the heater from the thermostat alone and yet when the subbase is added to the thermostat, the heater is thermally coupled to the thermostat to provide an operative system which has been found to be very satisfactory at a minimum cost to the home owner.

The present invention is described and presented in various embodiments; however, the intent is to limit the scope of the invention only by the appended claims in which we claim:

1. In a thermostat for controlling heating [ and cooling ] apparatus, *and being adaptable for controlling cooling apparatus by adding a subbase*, a main unit having a base, temperature responsive switch means mounted on said base, a first heater mounted *on said base* in thermal relation to said temperature responsive switch means, and connection means adapted to connect said heater and said switch means in a circuit for controlling the heating apparatus, a subbase unit having a second heater, *and* means for mounting said main unit on said subbase unit to thermally connect said second heater to said temperature responsive switch means and electrically connect said *first and* second [ heater ] *heaters* to said switch means and *adapted to connect* said switch means to control the *heating and the* cooling [ apparatus. ] *apparatuses*.

2. In a thermostat for controlling heating [ and cooling ] apparatus, *and being adaptable for controlling cooling apparatus by adding a subbase unit* a main unit having a base, temperature responsive means mounted on said base, first and second switch means, means connecting said first and second switch means to said temperature responsive means, a first heater mounted *on said base* in thermal relation to said temperature responsive switch means, and connection means adapted to connect said heater and said first switch means in a circuit for controlling the heating apparatus, and a subbase unit having a second heater, *and* means connecting said main unit and said subbase unit to thermally connect said second heater to said temperature responsive means and *adapted* to electrically connect said *first and* second switch means to control said *first and* second [heater] *heaters* and the *heating and the* cooling [ apparatus ] *apparatuses*.

3. In a thermostat for controlling heating apparatus and being adaptable for controlling cooling apparatus by adding an auxiliary base, a first base, temperature responsive means *having a first anticipation heater* mounted on said base, means connecting said temperature responsive means to control *said first heater and* the heating apparatus, a second auxiliary base, means connectively mounting said first and second bases together, [ an ] *a second* anticipation heater mounted on said second base, said *second* heater being thermally coupled to and effective to modify the temperature of said responsive means when said second base is mounted on said first base, and means including said second base connecting said temperature responsive means to control the *heating and the* cooling [ apparatus ] *apparatuses* said last mentioned means connecting said [ heater ] *heaters* to be selectively energized by said responsive means.

4. In a thermostat for controlling a first conditioning apparatus and being adaptable for controlling a second conditioning apparatus by adding a base unit, a first base *unit* temperature responsive means mounted on said base *a first anticipation heater mounted on said base unit*, means connecting said temperature responsive means to control *said first heater and* the first conditioning apparatus, a second base unit, means connecting said first and second base units, [an] *a second* anticipation heater means mounted on said second base unit, means thermally connecting said heater means to be effective to modify the temperature of said responsive means when said second base unit is mounted on said first base unit, and means included in said second base unit electrically connecting said temperature responsive means to control the *first and the* second conditioning [ apparatus ] *apparatuses*, said last mentioned means electrically connecting said [ heater ] *heaters* to be selectively energized.

[ 5. A thermostat assembly comprising a main body, a secondary body for modifying said main body, and means connecting said main body and said secondary body, said main body comprising a base member, a temperature responsive means, support means connected to said base member and said responsive means, switch means, and means connecting said switch means to said responsive means, said secondary body comprising an anticipation heater, a second base member, spring means supporting said heater on said second base member, said spring means engaging said support means to thermally connect said heater to said temperature responsive means when said main body is mounted on said secondary body, and connection means connecting said switch means to control the energization of said anticipation heater. ]

[ 6. A thermostat assembly comprising a main body connected to control heating apparatus and a secondary body connected to said main body controlling both heating and cooling apparatus, said main body comprising a temperature responsive means,
a base,
support means mounting said temperature responsive means on said base,
switch means,
connection means connecting said switch means to said temperature responsive means,
and electrical connection means adapted to connect said switch means to the heating apparatus, said secondary body comprising an anticipation heater, resilient means thermally connected to said heater, said resilient means engaging said support means when said main body is mounted on said secondary body to conduct heat from said heater to said temperature responsive means, connection means connecting said switch means to control the cooling apparatus, and further connecting means connecting said heater to said switch means.]

[7. A subbase to be connected to a thermostat having a temperature responsive switch means to control both heating and cooling conditioning apparatus but normally only controlling heating apparatus comprising, anticipation heater means, thermal connection means adapted to connect said heater means to said temperature responsive means when the thermostat is connected to said subbase, and electrical connection means connecting said heater means to the temperature responsive switch means when said switch means is connected to control the conditioning apparatus.]

[8. A subbase to be connected to a thermostat having a temperature responsive switch means adapted to control both heating and cooling apparatus comprising, a base, anticipation heater means mounted on said base, resilient connection means connected to said heater means and adapted to be thermally connected to said temperature responsive means when the thermostat is connected to said subbase, and electrical connection means adapted to connect said heater means to be controlled by the temperature responsive switch means when said switch means is connected to control cooling apparatus.]

[9. In a subbase adapted to be connected to a thermostat having a temperature responsive switch means, a base, means for connecting said base to the thermostat, anticipation heater means, resilient connection means connected to said base and said heater means, said resilient means being adapted to engage the temperature responsive switch means when the thermostat is connected to said subbase to conduct heat from said heater to said temperature responsive switch means, and electrical connection means adapted to connect said heater means to a source of power when the switch means is connected to conditioning apparatus.]

10. In a thermostat, *adaptable for controlling heating apparatus and being adaptable for controlling apparatus by adding a secondary unit*, a main unit having a temperature responsive switch means *and an anticipation heating means* adapted to control heating [and cooling apparatuses,] *apparatus*, electrical means adapted to connect said switch means to control one of the apparatuses, a secondary unit having electrical means adapted to connect said switch means to control both said heating and cooling apparatuses, and means connecting said main and secondary units, an improvement comprising *a second* anticipation heating means in said secondary unit and means to thermally connect said *second* heating means to said temperature responsive switch means whereby said main unit when used separately to control heating apparatus can have a minimum cost and upon a need for the control of *heating and* cooling [apparatus] *apparatuses* said secondary unit can be added.

[11. In a control system, temperature control means comprising a base, a bimetal, means mounting said bimetal on said base, a switch having first and second circuits, and means mounting said switch on said bimetal; heating control apparatus; a source of power; circuit means including said first circuit for connecting said heating control apparatus to said source; and a subbase for said temperature control means, means connecting said subbase to said base, said subbase comprising an electrical heater, resilient means engaging said means mounting for thermally connecting said heater to said responsive means, cooling control apparatus, circuit means including said second circuit for connecting said cooling control apparatus to said source, and circuit means selectively connecting said heater means to said source.]

[12. In a thermostat for controlling a first conditioning apparatus and being adaptable for controlling a second conditioning apparatus by adding an auxiliary base unit, a first base, temperature responsive means, support means mounting said temperature responsive means on said base, means adapted to connect said temperature responsive means to control the first conditioning apparatus, a second base unit, an anticipation heater means, means mounting said heater means on said second base unit, said first base having an opening for air flow, said heater means being effective to modify the temperature of said responsive means when said second base unit is mounted on said first base unit by the flow of heated air from said heater means through said opening, and means including said second base unit when mounted on said first base unit adapted to electrically connect said temperature responsive means to control the second conditioning apparatus.]

[13. In a control system for controlling temperature control apparatuses, temperature control means comprising a base, a bimetal mounted on said base, a switch having first and second circuits, and means mounting said switch on said bimetal;

first temperature control apparatus;

a source of power;

circuit means including said first circuit for connecting said first control apparatus to said source;

a subbase, means connecting said subbase to said temperature control means;

said temperature control means comprising an electrical heater, and means thermally connecting said heater to said responsive means;

second temeprature control apparatus;

circuit means including said second circuit for connecting said second control apparatus to said source; and circuit means connecting said heater means to said source.]

*14. In a thermostat assembly, wherein a thermostat for controlling heating apparatus is used for controlling heating and cooling apparatus by the addition of a sub-*

*base, comprising*

*a thermostat adapted to be mounted on a wall, said thermostat comprising a base, temperature responsive means attached to said base, switch means connected to said temperature responsive means, said switch means having a first circuit and a second circuit, a heat anticipation heater mounted on said base and being thermally connected to said temperature responsive means, and connection means connecting said first circuit of said switch means and said heat anticipation heater in a circuit to terminals on said base so that heating apparatus can be controlled upon being connected to said terminals, and*

*a subbase adapted to be mounted between said thermostat and the wall to modify said thermostat when it is desired to convert said thermostat to control heating and cooling apparatus, said subbase comprising, a second heat anticipation heater, and connection means when said subbase is placed under said thermostat for connecting said first circuit of said switch means and said first heater to first terminals on said subbase so that heating apparatus can be controlled upon being connected to said first terminals and for connecting said second circuit of said switch means and said second heater to other terminals on said subbase so that cooling apparatus can be controlled upon being connected to said other terminals, said second heater being thermally connected to said temperature responsive means by a solid heat conducting connection made when said thermostat is mounted on said subbase.*

* * * * *